United States Patent
Gerstenberger et al.

(10) Patent No.: US 8,228,403 B2
(45) Date of Patent: Jul. 24, 2012

(54) GENERATING COLUMN OFFSET CORRECTIONS FOR IMAGE SENSORS

(75) Inventors: Jeffrey S. Gerstenberger, Rochester, NY (US); Ravi Mruthyunjaya, Penfield, NY (US)

(73) Assignee: OmniVision Technologies, Inc., Santa Calra, CA (US)

( * ) Notice: Subject to any disclaimer, the term of this patent is extended or adjusted under 35 U.S.C. 154(b) by 280 days.

(21) Appl. No.: 12/655,559

(22) Filed: Dec. 31, 2009

(65) Prior Publication Data

US 2011/0157434 A1    Jun. 30, 2011

(51) Int. Cl.
H04N 9/64    (2006.01)

(52) U.S. Cl. ......................... 348/243; 348/246

(58) Field of Classification Search ............ 348/241, 348/243–247

See application file for complete search history.

(56) References Cited

U.S. PATENT DOCUMENTS

| | | | |
|---|---|---|---|
| 6,903,670 | B1 | 6/2005 | Lee et al. |
| 7,542,075 | B2 | 6/2009 | Suzuki et al. |
| 7,564,486 | B2 | 7/2009 | Ikeda |
| 2003/0202111 | A1* | 10/2003 | Park .............................. 348/243 |
| 2005/0068431 | A1 | 3/2005 | Mori |
| 2006/0082675 | A1* | 4/2006 | McGarvey et al. ........... 348/362 |
| 2007/0019085 | A1* | 1/2007 | Suzuki ........................... 348/241 |
| 2009/0122167 | A1 | 5/2009 | Noh |
| 2009/0167913 | A1 | 7/2009 | Takenaka et al. |
| 2009/0278962 | A1 | 11/2009 | Richardson et al. |
| 2010/0053383 | A1* | 3/2010 | Ichikawa ....................... 348/247 |
| 2010/0085438 | A1* | 4/2010 | Richardson ................ 348/222.1 |
| 2011/0157433 | A1 | 6/2011 | Gerstenberger et al. |
| 2011/0157435 | A1 | 6/2011 | Gerstenberger et al. |

FOREIGN PATENT DOCUMENTS

| | | |
|---|---|---|
| EP | 1 475 957 | 11/2004 |
| EP | 0 986 900 | 8/2005 |
| EP | 1615426 A1 | 1/2006 |
| WO | WO 2009/137037 A1 | 11/2009 |

OTHER PUBLICATIONS

PCT/US2010/060430—International Search Report and Written Opinion of the International Searching Authority, mailed Mar. 3, 2011 (8 pages).
PCT/US2010/062121—International Search Report and Written Opinon of the International Searching Authority, mailed Mar. 22, 2011 (12 pages).
PCT/US2010/060451—International Search Report and Written Opinion of the International Searching Authority, mailed Feb. 28, 2011 (8 pages).

* cited by examiner

*Primary Examiner* — Kelly L Jerabek
(74) *Attorney, Agent, or Firm* — Blakely Sokoloff Taylor & Zafman LLP (57) ABSTRACT

An image sensor includes multiple photoactive pixels and multiple dark reference pixels arranged in rows and columns to form a pixel array. A dark signal is read out of one or more dark reference pixels in each column and used to determine a column offset for one or more columns in the pixel array. Each time an image or frame of an image is read out, the column offset for the one or more columns is updated using dark signals read out from a given number of dark reference pixels. The column offset for the one or more columns is scaled when a gain level is changed for a captured image.

3 Claims, 7 Drawing Sheets

GENERATING COLUMN OFFSET CORRECTIONS FOR IMAGE SENSORS

TECHNICAL FIELD

The present invention relates generally to image sensors, and more particularly to methods for compensating for column fixed pattern noise in image sensors. Still more particularly, the present invention relates to methods for generating column offset corrections used to compensate for column fixed pattern noise in image sensors.

BACKGROUND

Complementary Metal Oxide Semiconductor (CMOS) image sensors typically include multiple pixels that are arranged in rows and columns to form a pixel array. A column output circuit is connected to each column of pixels in the array to read out the signals from the pixels in the column. The output signals from a row of pixels are read out of the pixel array one row at a time (in parallel) by the column output circuits.

The column output circuits can include both analog and digital circuits, including capacitors, switches, multiplexers, transistors, and amplifiers. The quality of an image captured by a CMOS image sensor can be reduced due to differences or mismatches between the offsets and the gains of the circuitry in the column output circuits. These mismatches produced column fixed pattern noise artifacts or defects in the images. Column fixed pattern noise is more visible and objectionable to an observer due to the columnar or striped structure of the column fixed pattern noise.

When an image is captured, a gain is often applied to the output signals of the pixels. This is especially true when the image is captured in low light conditions, where the gain is used to make the image brighter. Unfortunately, column fixed pattern noise is also amplified by the gain, making the column fixed pattern noise artifacts even more noticeable in an image. For example, a twofold increase in the gain can result in a doubling of the column fixed pattern noise.

SUMMARY

The present invention relates to a method for determining column offset corrections used to compensate for column fixed pattern noise in images captured by an image sensor. The image sensor includes multiple photoactive pixels and multiple dark reference pixels typically arranged in rows and columns to form a pixel array. A dark signal is read out from multiple dark reference pixels in each column at a given or first gain level. A column offset correction is then determined for one or more columns in the pixel array using the dark signals read out at the given or first gain level. The column offset corrections can be updated each time a given number of dark reference pixels are read out of the pixel array at the first gain level. A change to a different gain level is detected, and the column offset corrections are scaled in response to the detected change in the gain level. The column offset corrections are scaled based on an amount of change between the current gain level and the previous gain level in an embodiment in accordance with the invention. Scaled column offset corrections can be updated each time a given number of dark signals are read out of the pixel array.

BRIEF DESCRIPTION OF THE DRAWINGS

Embodiments of the invention are better understood with reference to the following drawings. The elements of the drawings are not necessarily to scale relative to each other.

DETAILED DESCRIPTION

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means either a direct electrical connection between the items connected, or an indirect connection through one or more passive or active intermediary devices. The term "circuit" means either a single component or a multiplicity of components, either active or passive, that are connected together to provide a desired function. The term "signal" means at least one current, voltage, or data signal.

Additionally, directional terms such as "on", "over", "top", "bottom", are used with reference to the orientation of the Figure(s) being described. Because components of embodiments of the present invention can be positioned in a number of different orientations, the directional terminology is used for purposes of illustration only and is in no way limiting.

Referring to the drawings, like numbers indicate like parts throughout the views.

Figure 1:
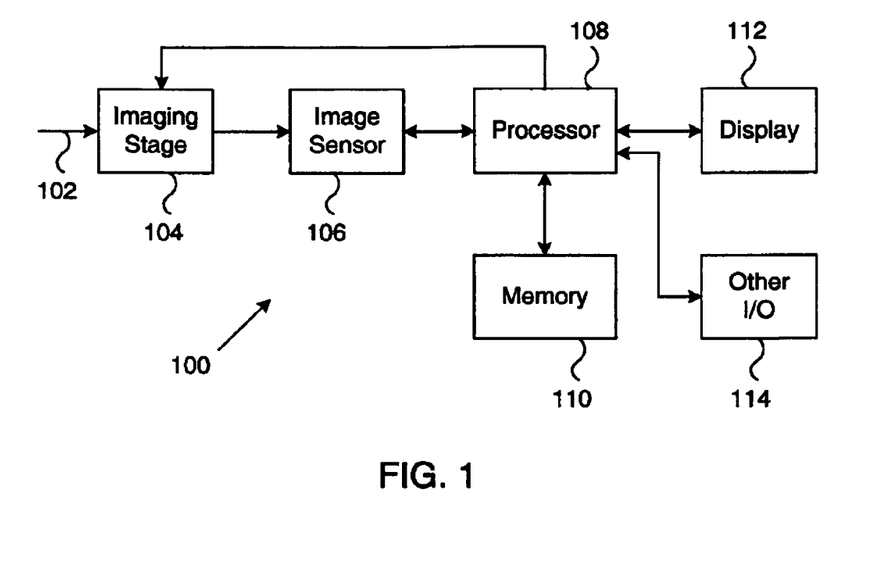
FIG. 1 is a simplified block diagram of an image capture device in an embodiment in accordance with the invention.

FIG. 1 is a simplified block diagram of an image capture device in an embodiment in accordance with the invention. Image capture device 100 is implemented as a digital camera in FIG. 1. Those skilled in the art will recognize that a digital camera is only one example of an image capture device that can utilize an image sensor incorporating the present invention. Other types of image capture devices, such as, for example, cell phone cameras, scanners, and digital video camcorders, can be used with the present invention.

In digital camera 100, light 102 from a subject scene is input to an imaging stage 104. Imaging stage 104 can include conventional elements such as a lens, a neutral density filter, an iris and a shutter. Light 102 is focused by imaging stage 104 to form an image on image sensor 106. Image sensor 106 captures one or more images by converting the incident light into electrical signals. Digital camera 100 further includes processor 108, memory 110, display 112, and one or more additional input/output (I/O) elements 114. Although shown as separate elements in the embodiment of FIG. 1, imaging stage 104 may be integrated with image sensor 106, and possibly one or more additional elements of digital camera 100, to form a camera module. For example, a processor or a memory may be integrated with image sensor 106 in a camera module in embodiments in accordance with the invention.

Processor 108 may be implemented, for example, as a microprocessor, a central processing unit (CPU), an application-specific integrated circuit (ASIC), a digital signal processor (DSP), or other processing device, or combinations of multiple such devices. Various elements of imaging stage 104 and image sensor 106 may be controlled by timing signals or other signals supplied from processor 108.

Memory 110 may be configured as any type of memory, such as, for example, random access memory (RAM), read-only memory (ROM), Flash memory, disk-based memory, removable memory, or other types of storage elements, in any combination. A given image captured by image sensor 106 may be stored by processor 108 in memory 110 and presented on display 112. Display 112 is typically an active matrix color liquid crystal display (LCD), although other types of displays may be used. The additional I/O elements 114 may include, for example, various on-screen controls, buttons or other user interfaces, network interfaces, or memory card interfaces.

It is to be appreciated that the digital camera shown in FIG. 1 may comprise additional or alternative elements of a type known to those skilled in the art. Elements not specifically shown or described herein may be selected from those known in the art. As noted previously, the present invention may be implemented in a wide variety of image capture devices. Also, certain aspects of the embodiments described herein may be implemented at least in part in the form of software executed by one or more processing elements of an image capture device. Such software can be implemented in a straightforward manner given the teachings provided herein, as will be appreciated by those skilled in the art.

Figure 2:
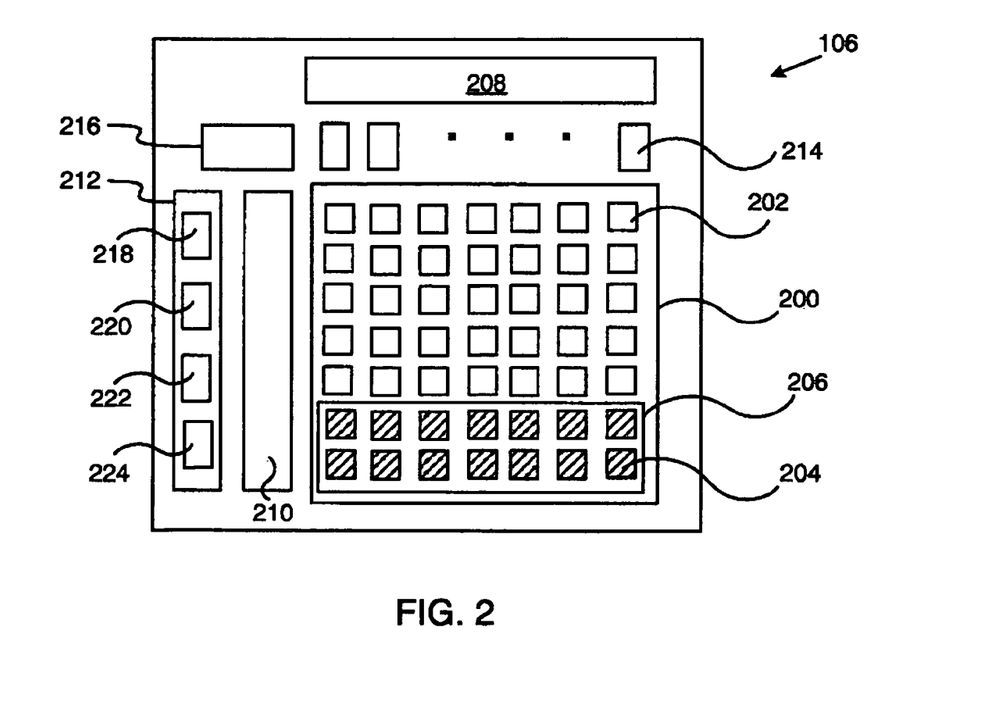
FIG. 2 is a block diagram of a top view of image sensor 106 in an embodiment in accordance with the invention.

Referring now to FIG. 2, there is shown a block diagram of a top view of image sensor 106 in an embodiment in accordance with the invention. Image sensor 106 includes a pixel array 200 that has photoactive pixels 202 and dark reference pixels 204. The photoactive and dark reference pixels 202, 204 are typically arranged in rows and columns within pixel array 200.

Photoactive pixels 202 are pixels that collect photo-generated charge carriers in response to incident light. Dark reference pixels 204 may be constructed as photoactive pixels with an opaque layer or light shield 206 positioned over dark reference pixels 204 so they do not receive incident light. Alternatively, dark reference pixels 204 can be constructed without photodetectors in an embodiment in accordance with the invention.

Dark reference pixels 204 are used to measure the amount of charge produced in image sensor 106 when the image sensor is not illuminated (zero light conditions). These dark signals are employed to reduce the amount of noise in captured images. In embodiments of the present invention, column offset corrections for each column in pixel array 200 are generated based on the dark signals read out of dark reference pixels 204. The column offset corrections are used to reduce or eliminated column fixed pattern noise in image sensors.

Image sensor 106 further includes column decoder 208, row decoder 210, digital logic 212, column output circuits 214, and analog front end circuit 216. Each column of photoactive and dark reference pixels 202, 204 in pixel array 200 is electrically connected to a column output circuit 214.

Digital logic 212 includes memory 218, control register 220, scaling circuitry 222, and timing generator 224. In an embodiment in accordance with the invention, memory 218 stores the column offset corrections, control register 220 stores the gain level used when an image is captured, and scaling circuitry 222 is used to scale the column offset corrections in response to a detected change in a gain level. Timing generator 224 generates the signals needed to read out signals from pixel array 200.

Image sensor 106 is implemented as an x-y addressable image sensor, such as, for example, a Complementary Metal Oxide Semiconductor (CMOS) image sensor, in an embodiment in accordance with the invention. Thus, column decoder 208, row decoder 210, digital logic 212, column output circuits 214, and analog front end circuit 216 are implemented as standard CMOS electronic circuits that are operatively connected to pixel array 200.

Functionality associated with the sampling and readout of pixel array 200 and the processing of corresponding image data may be implemented at least in part in the form of software that is stored in memory 110 (see FIG. 1) and executed by processor 108. Portions of the sampling and readout circuitry may be arranged external to image sensor 106, or formed integrally with pixel array 200, for example, on a common integrated circuit with photodetectors and other elements of the pixel array. Those skilled in the art will recognize that other peripheral circuitry configurations or architectures can be implemented in other embodiments in accordance with the invention.

For simplicity, FIG. 2 depicts seven rows and seven columns of pixels, with five rows of photoactive pixels 202 and two rows of dark reference pixels 204. Those skilled in the art will recognize image sensors have millions to tens of millions of pixels that can be arranged in any configuration. By way of example only, rows of dark reference pixels can be situated at the top and bottom of pixel array 200. Alternatively, the photoactive pixels can be confined in a sub-array with rows and columns of dark reference pixels surrounding the sub-array. Another exemplary embodiment disperses the dark reference pixels within the pixel array such that dark reference pixels are intermingled with photoactive pixels.

Figure 3:
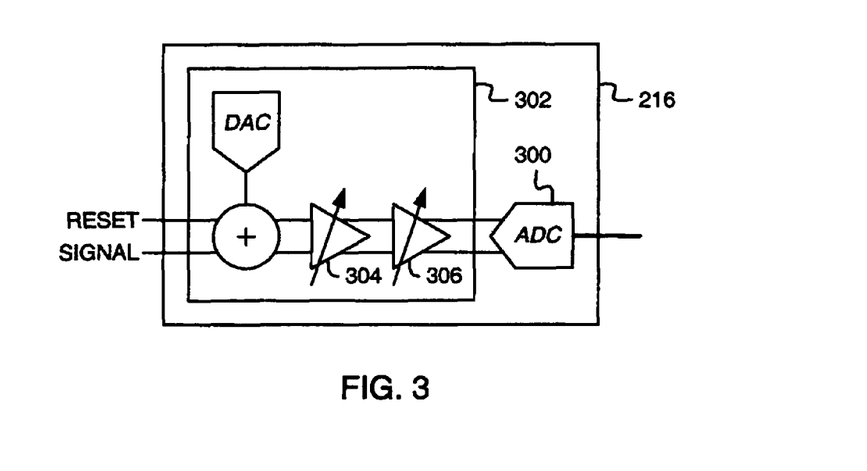
FIG. 3 is a block diagram of analog front end circuit 216 shown in FIG. 2.

FIG. 3 is a block diagram of analog front end circuit 216 shown in FIG. 2. Analog front end circuit 216 receives a differential pair of analog signals from each pixel in an embodiment in accordance with the invention. One analog signal is identified as RESET and the other signal as SIGNAL. Analog front end circuit 216 amplifies and conditions the RESET and SIGNAL analog signals, and converts the analog signals to digital signals.

Analog front end circuit 216 includes analog to digital converter (ADC) 300 and analog signal processor (ASP) 302. ASP 302 includes two cascaded variable gain amplifiers 304, 306 in an embodiment in accordance with the invention. Other embodiments in accordance with the invention can include one or more variable gain amplifiers. Changes in the gains of variable gain amplifiers 304, 306 are detected in the present invention and used to produce scaled column offset corrections in an embodiment in accordance with the invention.

Figure 4:
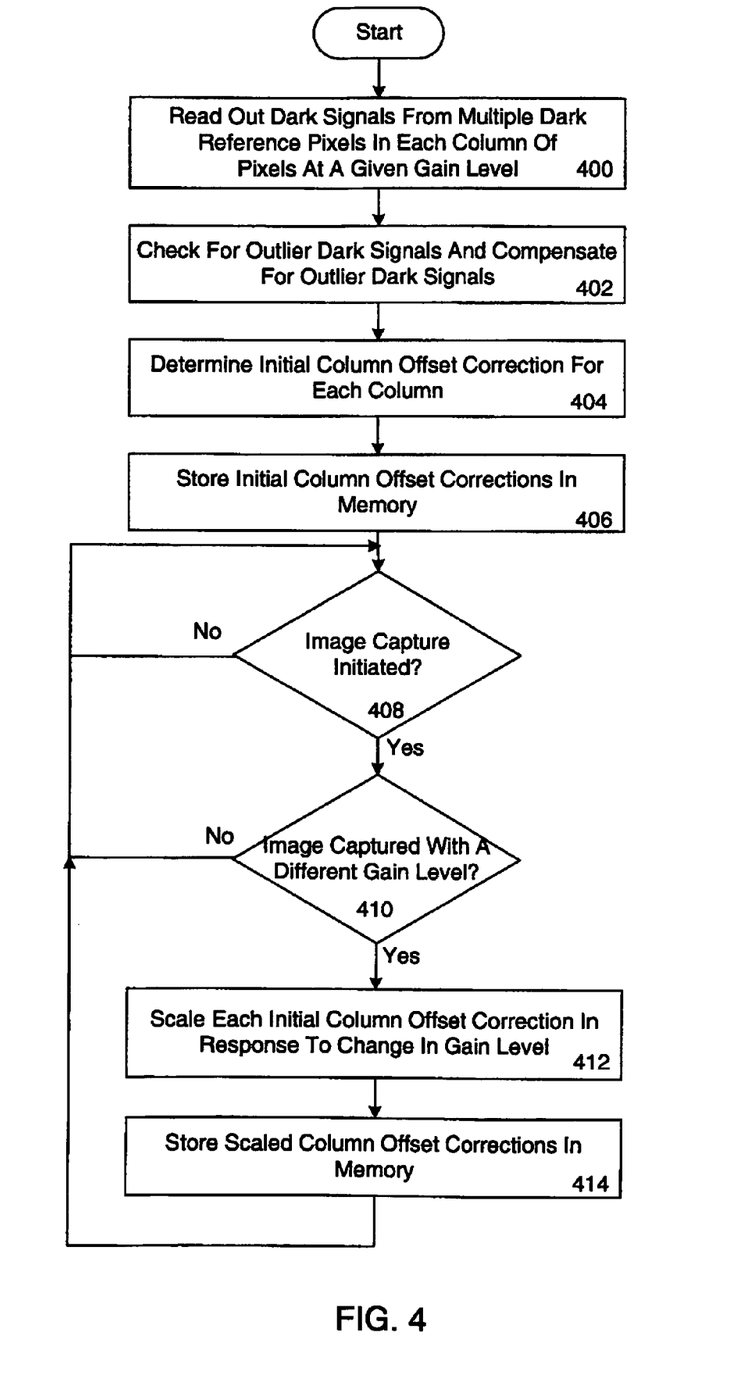
FIG. 4 is a flowchart of a first method for generating column offset corrections in an embodiment in accordance with the invention.

Referring now to FIG. 4, there is shown a flowchart of a first method for generating column offset corrections in an embodiment in accordance with the invention. Initially, dark signals from a given number of dark reference pixels in each column of pixels are read out at a given gain level (block 400). The gain level can be a gain setting or a measured gain in embodiments in accordance with the invention.

The number of dark reference pixels read out can vary in embodiments in accordance with the invention. In one embodiment, dark signals are read out of a large number of dark reference pixels in each column. A high number of dark signals can result in more precise initial column offset corrections.

Moreover, the given gain level can be any desired gain level. The gain level is high in one embodiment in accordance with the invention. A higher gain level can produce more accurate initial column offset corrections.

Block 400 can be performed at any time during the operation of an image sensor. Block 400 is first performed when an image sensor is turned on in one embodiment in accordance with the invention. This allows the blanked frame that is part of the start up sequence to be used for obtaining the dark signals.

Next, as shown in block 402, the dark signals from each column are analyzed to determine if there are any outlier dark signals. An outlier dark signal is a signal obtained from an unusually dark or light dark reference pixel in an embodiment in accordance with the invention. By way of example only, digital logic 212 (FIG. 2) analyzes the dark signals to determine if any are outlier dark signals. A method for detecting and compensating for outlier dark signals is described later with reference to FIGS. 7A-7B. If any of the dark signals are outlier dark signals, the outlier dark signals are discarded or compensated for in embodiments in accordance with the invention.

An initial column offset correction is then determined for each column in the pixel array and stored in a memory (blocks 404 and 406). The dark signals read out of a column are averaged together to produce an average dark signal value, and the average dark signal value is used as an initial column offset correction in one embodiment in accordance with the invention. Other embodiments in accordance with the invention can determine the initial offset corrections differently. By way of example only, the dark signals can be input into an infinite impulse response (IIR) filter to determine the initial column offset corrections.

A determination is then made at block 408 as to whether or not image capture has been initiated. The gain level is determined by an image capture device when the image capture process is initiated in an embodiment in accordance with the invention. The gain level can be determined by an automatic exposure algorithm, by user selection, or by some other method. The gain level is transmitted to the image sensor and stored in control register 220 (FIG. 2) in an embodiment in accordance with the invention.

A determination is then made at block 410 as to whether or not the image will be captured with a different gain level than the gain level used at block 400 and block 404. Digital logic 212 detects changes in the gain level in an embodiment in accordance with the invention. If the gain level has not changed, the method returns to block 408. If the image will be captured with a different gain level, the process continues at block 412 where the initial column offset corrections are scaled in response to the different gain level. The initial column offset corrections are scaled by the ratio of a new gain setting to a previous gain setting in one embodiment in accordance with the invention. In another embodiment in accordance with the invention, the initial column offset corrections are scaled by the ratio of a current measured gain to a previous measured gain.

The scaled offset corrections are then stored in memory, as shown in block 414. The method returns to block 408. Blocks 412 and 414 repeat each time an image is captured with a different gain level in an embodiment in accordance with the invention.

The method of FIG. 4 updates the column offset corrections when a change in a gain level is detected. The column offset corrections are updated by scaling the initial column offset corrections. This method advantageously avoids repeatedly reading out dark signals when determining column offset corrections, thereby reducing the frame overhead (e.g., time) needed to compute a column offset correction for each column in the pixel array.

Embodiments in accordance with the invention are not limited to the blocks and the order of the blocks shown in FIG. 4. Other embodiments in accordance with the invention can perform additional steps, not perform some of the blocks, or perform some of the steps concurrently. By way of example only, detecting outlier dark signals and compensating for such outlier dark signals (block 402) can be executed concurrently with reading out dark signals (block 400). Alternatively, block 402 or block 414 does not have to be performed in other embodiments in accordance with the invention.

Figure 5:
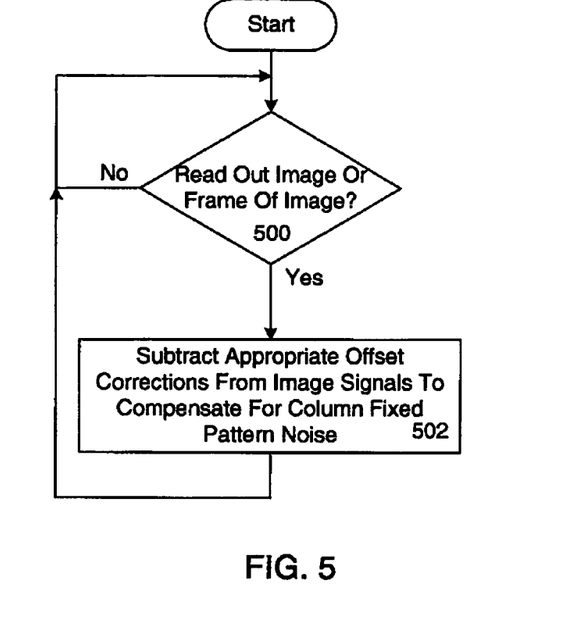
FIG. 5 is a flowchart of a first method for using the column offset corrections generated according to the first method shown in FIG. 4.

FIG. 5 is a flowchart of a method for using the column offset corrections generated according to the method shown in FIG. 4. Initially, a determination is made as to whether or not an image or frame of an image is to be read out of a pixel array (block 500). If so, the appropriate column offset correction is subtracted from the image signals read out of each column (block 502). The appropriate column offset correction is the initial column offset correction or a previously scaled initial column offset when the image or the frame of an image is captured without a change in the gain level. Alternatively, the appropriate column offset correction is a currently scaled column offset correction when the image or frame of an image is captured with a different gain level than the gain level associated with the initial column offset correction.

The scaling of the initial column offset corrections in response to a change in gain level (block 412 in FIG. 4) can be done concurrently with subtracting the appropriate offset correction from image signals (block 502 in FIG. 5) in one embodiment in accordance with the invention. That is, the appropriate offset correction can be determined and scaled (if necessary due to a change in gain) on-the-fly as needed during readout of a frame or image in order to provide offset correction to each image signal as it is read out. This avoids the need for a memory to store the scaled offset correction.

Figure 6A:
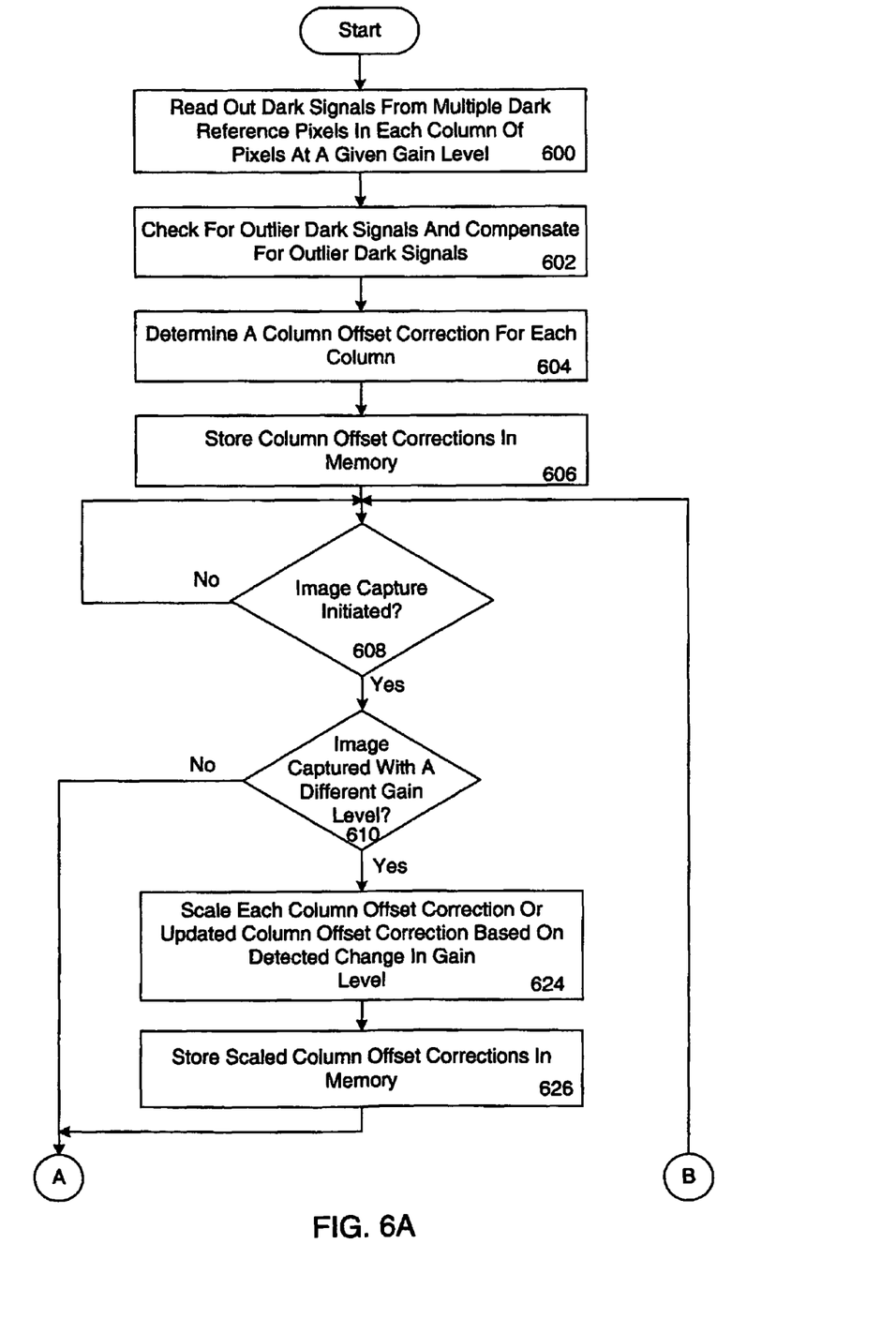
FIGS. 6A-6B depict a flowchart of a second method for generating and using column offset corrections in an embodiment in accordance with the invention.
Figure 6B:
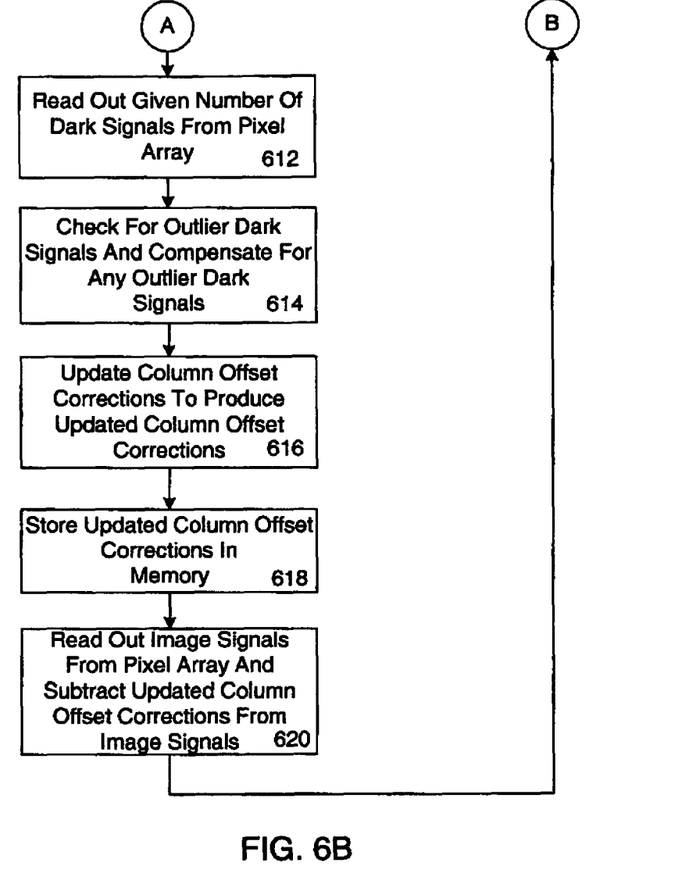

Referring now to FIGS. 6A-6B, there is shown a flowchart of a second method for generating and using column offset corrections in an embodiment in accordance with the invention. Initially, dark signals from a given number of dark reference pixels in each column of pixels are read out at a given gain level (block 600). The gain level can be a gain setting or a measured gain in embodiments in accordance with the invention.

The number of dark reference pixels read out can vary in embodiments in accordance with the invention. Dark signals are read out of a few dark reference pixels in each column in one or more embodiments in accordance with the invention. For example, in one embodiment in accordance with the invention, dark signals are read out of thirty-six dark reference pixels in each column. In another embodiment in accordance with the invention, dark signals are read out of eight dark reference pixels in each column.

The given gain level can be any desired gain level. The gain level is high in one embodiment in accordance with the invention. A higher gain level can result in more accurate initial column offset calculations.

Block 600 can be performed at any time during the operation of an image sensor. Block 600 is first performed when an image sensor is turned on in one embodiment in accordance with the invention. This allows the blanked frame that is part of the start up sequence to be used for obtaining the dark signals.

Next, as shown in block 602, the dark signals from each column are analyzed to determine if there are any outlier dark signals. As discussed earlier, an outlier dark signal is a signal obtained from an unusually dark or light dark reference pixel in an embodiment in accordance with the invention. A method for detecting and compensating for outlier dark signals is described later with reference to FIGS. 7A-7B. If any of the dark signals are outlier dark signals, compensation dark signals are used or the outlier dark signals are discarded in embodiments in accordance with the invention.

A column offset correction is then determined for each column in a pixel array, as shown in block 604. In one embodiment in accordance with the invention, the dark signals read out of each column are averaged together to produce a column average dark signal value, and the column average dark signal value is used as a column offset correction. The column offset corrections are stored in a memory (block 606).

A determination is then made as to whether or not image capture has been initiated (block 608). As previously described, the gain level is determined by an image capture device when the image capture process is initiated in an embodiment in accordance with the invention. The gain level can be determined by an automatic exposure algorithm, by user selection, or by some other method. The gain level is transmitted to the image sensor and stored in control register 220 (FIG. 2) in an embodiment in accordance with the invention.

A determination is then made at block 610 as to whether or not the image is captured with a different gain level than the gain level associated with the column offset corrections stored in memory at block 606 or at block 618, whichever occurred last. Digital logic 212 detects changes in the gain level in an embodiment in accordance with the invention.

When the image is not captured with a different gain level, the process continues at block 612 where a given number of dark signals are read out of the dark reference pixels. The given number of dark reference pixels read out of the pixel array can change dynamically each time dark signals are read out of dark reference pixels in embodiments in accordance with the invention. Thus, one read operation may read out eight dark reference pixels to determine a column offset correction and another read operation may read out ten dark reference pixels. By way of examples only, the number of dark signals read out of the pixel array can be based on noise in the dark reference pixels, on statistical measurements on the column offset corrections, on whether the pixels are being read for an update after the gain level changes for the first time, or whether the dark reference pixels are being read for a subsequent update.

Next, after the given number of dark pixels are read, the dark signals from each column are analyzed to determine if there are any outlier dark signals (block 614). A method for compensating for outlier dark signals is described later with reference to FIGS. 7A-7B. The previous column offsets are then updated to produce updated column offsets, as shown in block 616. The updated column offset corrections are stored in memory (block 618).

In one embodiment in accordance with the invention, the column offset corrections are re-calculated using the newly read out dark signals and the previously computed column offset corrections. By way of example only, the average dark signal level for each column is re-calculated each time the given number of dark signals are read out of the pixel array. The re-computed column offset corrections are used as updated column offset corrections. Other embodiments in accordance with the invention can produce updated column offset corrections differently. By way of example only, the updated column offsets can be produced using a weighted average or an IIR filter in other embodiments in accordance with the invention.

Each updated column offset correction is then subtracted from the image signals read out of the column associated with the updated column offset correction (block 620). Subtracting the updated column offset corrections from the image signals compensates for column fixed pattern noise. The method then returns to block 608.

Referring again to block 610, the process passes to block 624 when a different gain level is used when capturing an image. At block 624 the column offset corrections or the updated column offset corrections are scaled to produce scaled column offset corrections. The amount of scaling is based on a detected change in the gain level. For example, the column offset corrections or updated column offset corrections are scaled by the ratio of a new gain setting to a previous gain setting in one embodiment in accordance with the invention. In another embodiment in accordance with the invention, the column offset corrections or the updated column offset corrections are scaled by the ratio of a current measured gain to a previous measured gain.

The scaled column offset corrections are then stored in memory (block 626). After block 626 is executed, the process passes to block 612 and blocks 612 through 620 are performed. After block 620 is executed, the method returns to block 608.

Embodiments in accordance with the invention are not limited to the blocks and the order of the blocks shown in FIGS. 6A-6B. Other embodiments in accordance with the invention can perform additional steps, not perform some of the blocks, or perform some of the steps concurrently. By way of example only, detecting outlier dark signals and compensating for such outlier dark signals (block 602 or 614) can be executed concurrently with reading out dark signals (block 600 or 612, respectively). Alternatively, block 602, block 606, block 614, block 618, or block 626 does not have to be performed in other embodiments in accordance with the invention.

Note that embodiments of the present invention can be used in different image sensor architectures other than the architecture illustrated in FIG. 2. By way of example only, an image sensor can switch which columns of pixels are connected to which column output circuits each time a row of pixels is read out of the image sensor. In general, this is done to fragment to some extent the columnar or striped nature of column fixed pattern noise. Embodiments of the present invention can determine and apply column offset corrections based solely on column circuits, even when the column output circuits are being switched from one pixel column to another. Embodiments of the present invention can determine and apply column offset corrections based solely on pixel column. Alternatively, embodiments of the present invention can determine and apply column offset corrections to each combination of pixel column and column output circuit.

Similarly, an image sensor can have column circuits that each serve two or more columns of pixels, thereby requiring multiple sample and read cycles to read each rows of pixels. Embodiments of the present invention applies column offset corrections to each column circuit, or each pixel column, or to each combination of pixel column and column output circuit. By way of further examples, multiple column output circuits can be available for each column of pixels. This may be the case if one set of column circuits is being read out while an alternate set of column circuits is sampling image signals in preparation for being read out. Again, the present invention is useful and is not restricted even though there is not a one-to-one correspondence between pixel columns and column output circuits.

Figure 7A:
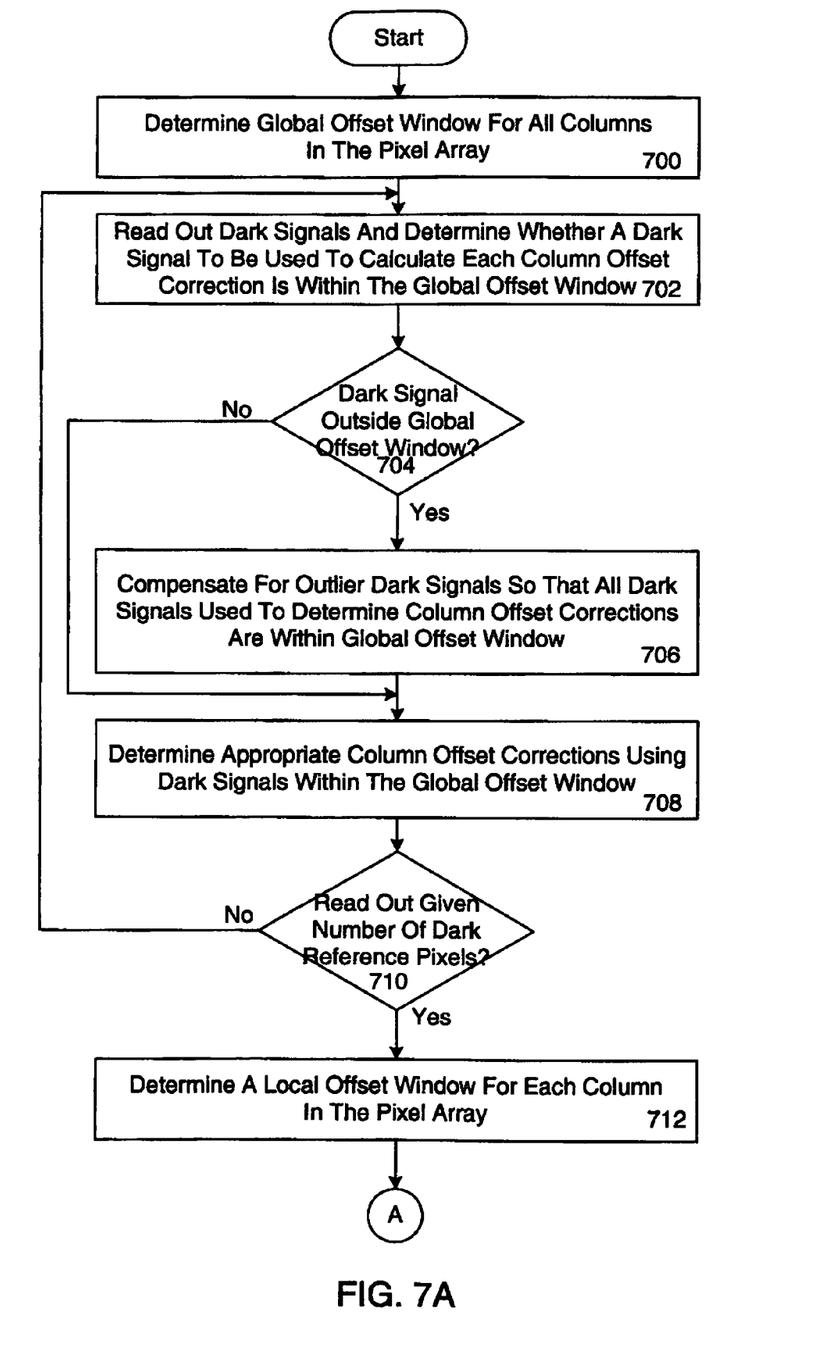
FIGS. 7A-7B illustrate a flowchart of a method for detecting outlier dark signals and compensating for the outlier dark signals when generating column offset corrections in an embodiment in accordance with the invention.
Figure 7B:
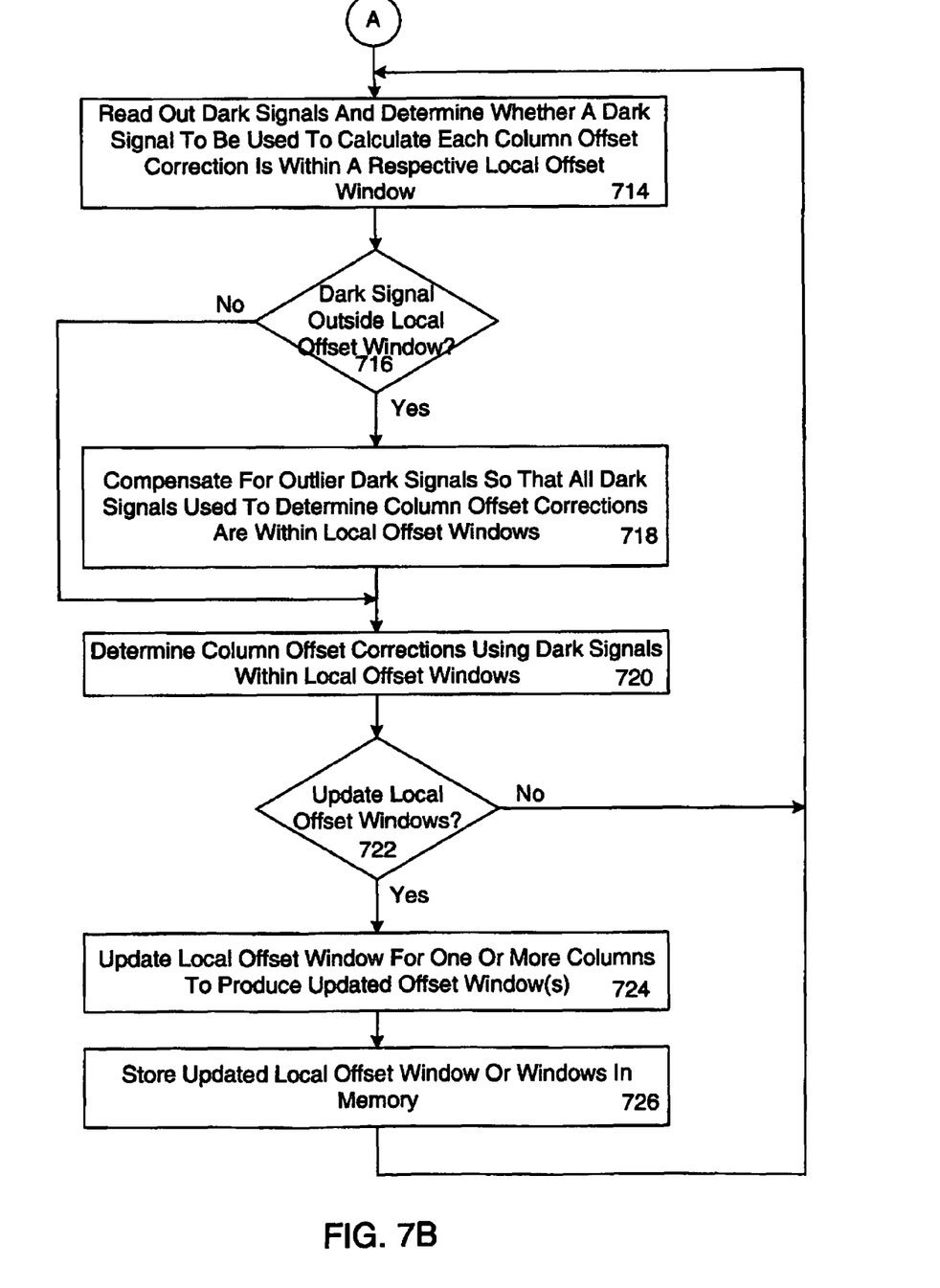

FIGS. 7A-7B depict a flowchart of a method for detecting outlier dark signals and compensating for the outlier dark signals when generating column offset corrections in an embodiment in accordance with the invention. Initially, a global offset window is determined for all of the columns in the pixel array (block 700). The global offset window identifies a range of acceptable dark signals for all of the columns in the pixel array. The range of acceptable dark signals includes a center dark signal, a maximum dark signal, and a minimum dark signal in an embodiment in accordance with the invention.

The center, minimum, and maximum dark signals can be based on expected dark signals in one embodiment in accordance with the invention. Alternatively, the center, minimum, and maximum dark signals can be based on measured dark signals in another embodiment in accordance with the invention. And in another embodiment in accordance with the invention, the center, minimum, and maximum dark signals can be based on previously determined center, minimum, and maximum dark signals. Other embodiments in accordance with the invention can determine the range of acceptable dark signals for all of the columns in the pixel array differently.

Next, as shown in block 702, dark signals from a given number of dark reference pixels in each column of pixels are read out and the dark signals analyzed to determine whether the dark signals are within the global offset window. A determination is then made at block 704 as to whether or not one or more dark signals from each column is outside the global offset window. If so, the dark signals outside the global offset window are outlier dark signals. The outlier dark signals are compensated for so that all of the dark signals used to determine the initial column offsets (block 404 FIG. 4) or the column offsets (block 604 FIG. 6A) are within the global offset window (block 706).

The outlier dark signals are compensated for by substituting a previous dark signal, a selected dark signal, or estimated dark signal for each outlier dark signal in one embodiment in accordance with the invention. In another embodiment in accordance with the invention, the outlier dark signals are compensated for by substituting an average dark signal value for each outlier dark signal. In yet another embodiment in accordance with the invention, a median or mode dark signal is used in place of each outlier dark signal. Alternatively, each outlier dark signal can be discarded and the column offset correction determined with fewer dark signals in another embodiment in accordance with the invention. Other embodiments in accordance with the invention can compensate for outlier dark signals using different techniques than the ones described herein.

The appropriate column offset corrections are then determined using dark signals that are within the global offset window (block 708). For example, the initial column offset corrections (block 404 in FIG. 4) or the column offset corrections (block 604 in FIG. 6A) are determined at block 708. And depending on the number of dark signals read out of the dark reference pixels, the updated column offset corrections (block 618 in FIG. 6B) may also be determined using signals within the global offset window in an embodiment in accordance with the invention.

Next, at block, 710, a determination is made as to whether or not a given number of dark reference pixels have been read out. The given number of dark reference pixels is based on a confidence level in the scaled column offsets or the updated column offsets in one embodiment in accordance with the invention. Alternatively, the given number of dark reference pixels is based on the factors described with reference to block 612 in FIG. 6.

If the given number of dark reference pixels has not been reached, the global offset window continues to be used to determine outlier dark signals. When the given number of dark reference pixels have been read out, the method continues at block 712 where a local offset window is determined for each column in the pixel array. A local offset window identifies a range of acceptable dark signals for one column in the pixel array in an embodiment in accordance with the invention. The range of acceptable dark signals for a local offset window is based on the dark signals read out of that column in an embodiment in accordance with the invention. By way of example only, the local offset window can be based on the average dark signal value for that column.

Dark signals are then read out from a given number of dark reference pixels in each column of pixels and analyzed to determine whether the dark signals are within a respective local offset window (block 714). A determination is made at block 716 as to whether or not one or more dark signals from each column is outside the local offset window associated with that column. If so, the dark signals outside the local offset windows are outlier dark signals. The outlier dark signals are compensated for so that all of the dark signals used to determine the column offset corrections (block 404 FIG. 4 and block 604 FIG. 6A) or the updated column offset corrections (block 618 in FIG. 6A) are within their respective local offset windows (block 718) in an embodiment in accordance with the invention. The outlier dark signals can be compensated for by using a technique described in conjunction with block 706.

The appropriate column offset corrections are then determined using dark signals within the local offset windows (block 720). In one embodiment in accordance with the invention, the column offset corrections (block 604 in FIG. 6A) or the updated column offset corrections (block 618 in FIG. 6B) are determined at block 720. Next, at block, 722, a determination is made as to whether or not one or more local offset windows is to be updated. If not, the method returns to block 714.

When one or more local offset windows are to be updated, one or more updated local offset windows are produced, as shown in block 724. A local offset window is updated by analyzing the dark signals read out of a column and comparing them to the range of acceptable dark signals included in the local offset window in an embodiment in accordance with the invention. The range of acceptable dark signals is adjusted based on the levels of the dark signals read out of the column. The range of acceptable dark signals can be increased, decreased, the minimum and maximum dark signals changed, or combinations of these can be used to update a local offset window in one or more embodiments in accordance with the invention.

The updated local offset window or windows are stored in memory at block 726. The method then returns to block 714.

Embodiments in accordance with the invention are not limited to the blocks and the order of the blocks shown in FIGS. 7A-7B. Other embodiments in accordance with the invention can perform additional steps, not perform some of the blocks, or perform some of the steps concurrently. By way of example only, block 726 does not have to be performed in other embodiments in accordance with the invention.

Figure 8:
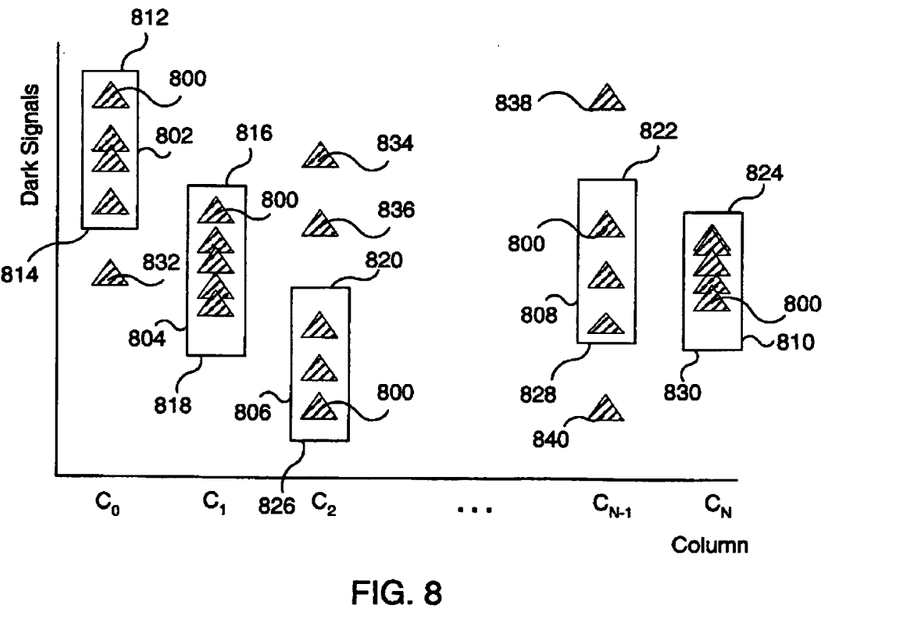
FIG. 8 is an exemplary plot of dark signals read out of each column that is used to depict local offset windows in an embodiment in accordance with the invention.

Referring now to FIG. 8, there is shown an exemplary plot of dark signals read out of each column that is used to depict local offset windows in an embodiment in accordance with the invention. Multiple dark signals 800 are read out of each column ($C_0, C_1, \ldots C_N$) in the pixel array. Local offset windows 802, 804, 806, 808, 810 are determined for the columns ($C_0, C_1, \ldots C_N$). Each local offset window defines a range of acceptable dark signals for its respective column. Local offset window 802 for column $C_0$ has a maximum dark signal 812 and a minimum dark signal 814 for that column. Local offset window 804 for column $C_1$ has a maximum dark signal 816 and a minimum dark signal 818 for that column. Similarly, local offset windows 806, 808, 810 for columns $C_2$, $C_{N-1}$, and $C_N$ have maximum dark signals 820, 822, 824 and minimum dark signals 826, 828, 830, respectively, for those columns.

As shown in FIG. 8, some of the columns have outlier dark signals. Column $C_0$ has one outlier dark signal 832. Both column $C_2$ and Column $C_{N-1}$ have two outlier dark signals 834, 836 and 838, 840, respectively. Columns $C_1$ and column $C_N$ do not have any outlier dark signals. The outlier dark signals 832, 834, 836, 838, 840 can be compensated for using techniques described earlier in conjunction with FIGS. 7A-7B.

Local offset windows 802, 804, 806, 808, 810 can be adjusted using the techniques described herein. A local offset window is updated by adjusting the range of acceptable dark signals. For example, the range can be increased, decreased, the minimum and maximum dark signals changed, or combinations of these can be used to update a local offset window in one or more embodiments in accordance with the invention.

The invention has been described in detail with particular reference to certain preferred embodiments thereof, but it will be understood that variations and modifications can be effected within the spirit and scope of the invention.

Even though specific embodiments of the invention have been described herein, it should be noted that the application is not limited to these embodiments. In particular, any features described with respect to one embodiment may also be used in other embodiments, where compatible. And the features of the different embodiments may be exchanged, where compatible.

PARTS LIST 100 image capture device
102 light
104 imaging stage
106 image sensor
108 processor
110 memory
112 display
114 other input/output devices
200 pixel array
202 photoactive pixels
204 dark reference pixels
206 opaque layer or light shield
208 column decoder
210 row decoder
212 digital logic
214 column output circuits
216 analog front end circuit
218 memory
220 control register
222 scaling circuitry
224 timing generator
300 analog to digital converter
302 analog signal processor
304 variable gain amplifier
306 variable gain amplifier
800 dark signals
802 local offset window
804 local offset window
806 local offset window
808 local offset window
810 local offset window
812 maximum dark signal
814 minimum dark signal
816 maximum dark signal
818 minimum dark signal
820 maximum dark signal
822 maximum dark signal
824 maximum dark signal
826 minimum dark signal
828 minimum dark signal
830 minimum dark signal
832 outlier dark signal
834 outlier dark signal
836 outlier dark signal
838 outlier dark signal
840 outlier dark signal

The invention claimed is:

1. A method for compensating for column fixed pattern noise in an image sensor, wherein the image sensor includes a plurality of photoactive pixels and a plurality of dark reference pixels arranged in rows and columns to form a pixel array, the method comprising:
   reading out, at a first gain level of pixel readout circuitry, dark signals from multiple dark reference pixels in each column;
   determining a column offset correction ("COC") for one or more columns in the pixel array using the dark signals read out at the first gain level;
   generating second gain COC by scaling the COC in response to capturing a first image at a second gain level of the pixel readout circuitry, wherein the first image is generated by a first image capture at the second gain level since turning on the image sensor; and
   applying the second gain COC to subsequent images captured at the second gain level, wherein the subsequent images are captured prior to a power cycling of the image sensor.

2. The method of claim 1, further comprising:
   generating third gain COC by scaling the COC in response to capturing a second image at a third gain level of the pixel readout circuitry, wherein the second image is generated by a first image capture at the third gain level since turning on the image sensor; and
   applying the third gain COC to further subsequent images captured at the third gain level, wherein the further subsequent images are captured prior to the power cycling of the image sensor.

3. A method for compensating for column fixed pattern noise in an image sensor, wherein the image sensor includes a plurality of photoactive pixels and a plurality of dark reference pixels arranged in rows and columns to form a pixel array, the method comprising:
   reading out, at a first gain level of pixel readout circuitry, dark signals from multiple dark reference pixels in each column;
   calculating a column offset correction ("COC") for one or more columns using the dark signals read out of respective dark reference pixels at the first gain level;
   updating the COC each time a given number of dark signals are read out of the pixel array at the first gain level;
   generating second gain COC by scaling the COC in response to capturing a first image at a second gain level of the pixel readout circuitry, wherein the first image is generated by a first image capture at the second gain level since turning on the image sensor; and applying the second gain COC to subsequent images captured at the second gain level, wherein the subsequent images are captured prior to a power cycling of the image sensor, wherein the COC is scaled based on an amount of change between the second gain level and the first gain level.

* * * * *